US011894648B2

(12) United States Patent
Torrey

(10) Patent No.: US 11,894,648 B2
(45) Date of Patent: Feb. 6, 2024

(54) DIELESS CRIMP HEAD WITH POSITIONING DEVICES FOR CRIMP CONNECTORS

(71) Applicant: Hubbell Incorporated, Shelton, CT (US)

(72) Inventor: Cameron Michael-Daniel Torrey, Lancaster, NH (US)

(73) Assignee: Hubbell Incorporated, Shelton, CT (US)

( * ) Notice: Subject to any disclaimer, the term of this patent is extended or adjusted under 35 U.S.C. 154(b) by 54 days.

(21) Appl. No.: 17/020,933

(22) Filed: Sep. 15, 2020

(65) Prior Publication Data

US 2021/0006026 A1 Jan. 7, 2021

Related U.S. Application Data

(63) Continuation of application No. PCT/US2020/000408, filed on Jul. 6, 2020.

(Continued)

(51) Int. Cl.

| | |
|---|---|
| ***H01R 43/058*** | (2006.01) |
| ***H01R 43/042*** | (2006.01) |
| *B21D 39/04* | (2006.01) |

(52) U.S. Cl.

CPC ....... *H01R 43/058* (2013.01); *H01R 43/0428* (2013.01); *B21D 39/048* (2013.01);

(Continued)

(58) Field of Classification Search

CPC .............. H01R 43/0428; H01R 43/058; H01R 43/0421; H01R 43/0424; B21D 39/048; Y10T 29/53235

See application file for complete search history.

(56) References Cited

U.S. PATENT DOCUMENTS

| | | | | |
|---|---|---|---|---|
| 3,481,018 A | | 12/1969 | Kerkhof et al. | |
| 5,500,999 A | * | 3/1996 | Yagi .................... | H01R 43/058 29/751 |

(Continued)

FOREIGN PATENT DOCUMENTS

| | | | | |
|---|---|---|---|---|
| EP | 3442084 | | | 2/2019 |
| JP | 2002190366 | A | * | 7/2002 |
| JP | 2016219315 | A | * | 12/2016 |

OTHER PUBLICATIONS

Ogihara et al, Mechanical Analysis of the Crimping Connection, IEEE, pp. 89-94, 2006 (Year: 2022).*

(Continued)

*Primary Examiner* — A. Dexter Tugbang

(74) *Attorney, Agent, or Firm* — Ruggiero McAllister & McMahon LLC

(57) ABSTRACT

A dieless crimp head is provided that includes a frame, an indentor, and a first positioning device. The frame has a first frame shell and a second frame shell, which define a frame opening. The indentor converges on a crimp center within the frame opening. The first positioning device has a connector slot defining a connector receipt area. The first positioning device is removably secured in the frame opening of the first frame shell at a use position in which the connector receipt area and the crimp center are aligned with, but offset along, a longitudinal axis of the crimp head.

17 Claims, 8 Drawing Sheets

Related U.S. Application Data

(60) Provisional application No. 62/870,836, filed on Jul. 5, 2019.

(52) U.S. Cl.
CPC ...... *H01R 43/0421* (2013.01); *H01R 43/0424* (2013.01); *Y10T 29/53235* (2015.01)

(56) References Cited

U.S. PATENT DOCUMENTS

| | | | | |
|---|---|---|---|---|
| 5,558,166 | A * | 9/1996 | Chen .................. | H01R 43/0428 81/9.4 |
| 6,990,843 | B2 * | 1/2006 | Frenken ............. | H01R 43/0424 72/402 |
| 8,479,380 | B2 | 7/2013 | Malewicz | |
| 9,270,072 | B2 | 2/2016 | Westley | |
| 10,279,402 | B2 | 5/2019 | Frenken | |
| 2005/0223548 | A1 * | 10/2005 | Chen .................. | H01R 43/0421 439/106 |
| 2009/0313820 | A1 | 12/2009 | Roman et al. | |
| 2011/0030447 | A1 | 2/2011 | Backenstoes et al. | |

OTHER PUBLICATIONS

Machine Translation of Japanese Patent Publication JP 2002-190366, Dec. 2022. (Year: 2022).*
International Search Report dated Sep. 21, 2020 in corresponding PCT Application PCT/US2020/040888.
Written Opinion dated Sep. 21, 2020 in corresponding PCT Patent Application PCT/US2020/040888.

* cited by examiner

FIG. 1
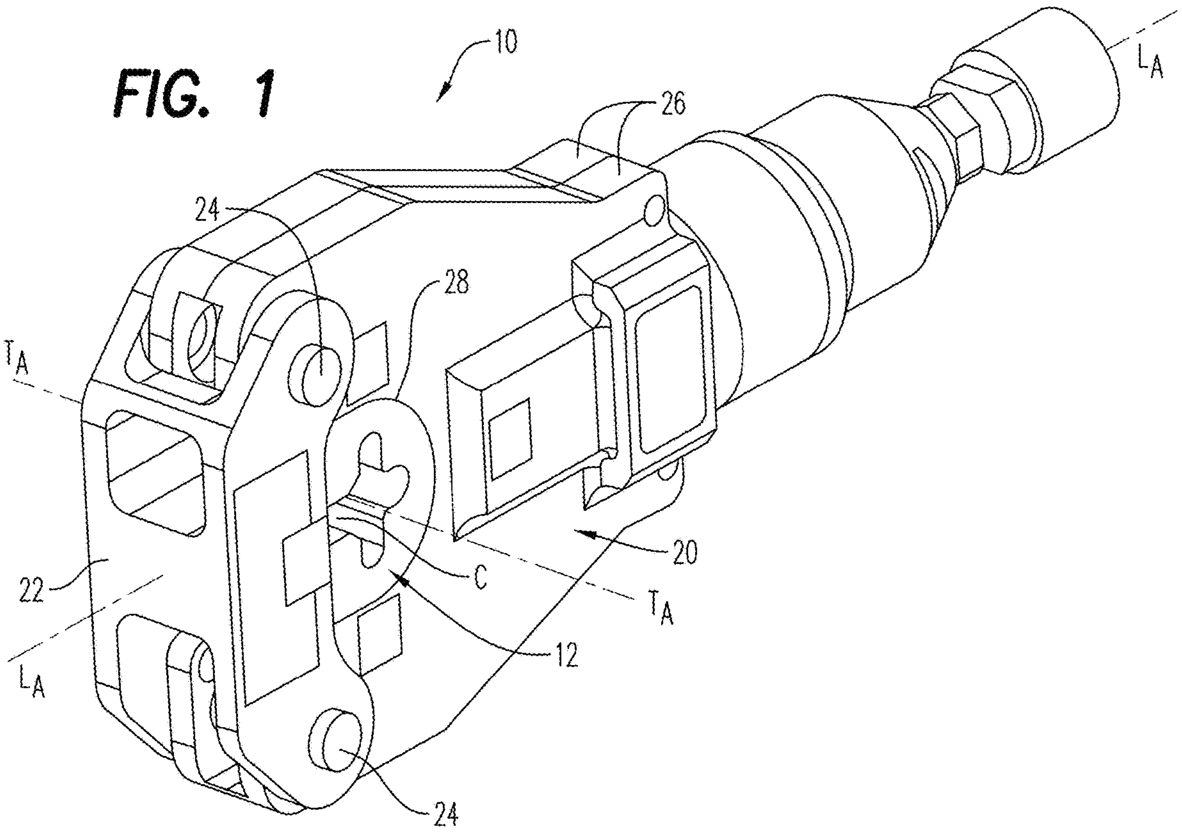
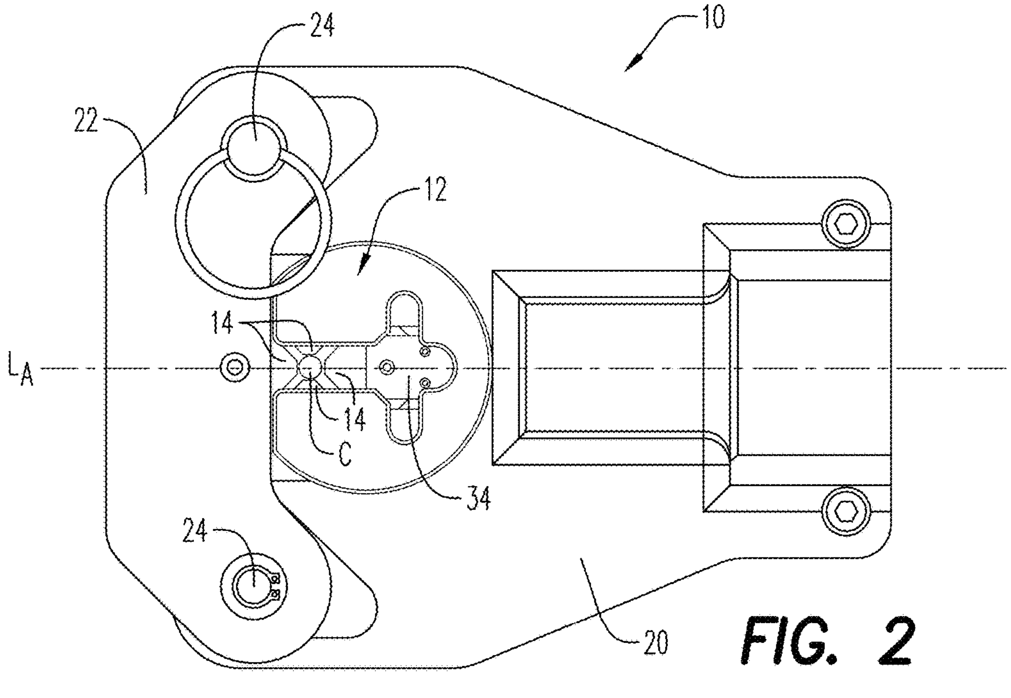
FIG. 2

DIELESS CRIMP HEAD WITH POSITIONING DEVICES FOR CRIMP CONNECTORS

CROSS REFERENCE TO RELATED APPLICATIONS

This application is a continuation of International Application PCT/US20/040888 filed Jul. 6, 2020, which claims priority of U.S. Application 62/870,836 filed Jul. 5, 2019, the entire contents of both of which are incorporated by reference herein.

BACKGROUND

1. Field of the Invention

The present disclosure is related to dieless crimp heads. More particularly, the present disclosure is related to dieless crimp heads with positioning devices for crimp connectors.

2. Description of Related Art

It is common for electrical connectors to be crimped onto the conductor during design and assembly of electrical installations. The crimping action can occur using a crimping tool, which can include a manual tool or a powered tool.

Some crimping tools have a crimp head with a die that crimps the connector. Other crimping tools are dieless, where the crimp head itself includes one or more indentors that crimp the connector.

During use of dieless crimp heads, the connector to be crimped is positioned in a desired location within the head—such as but not limited to centered—to allow the one or more indentors to crimp the connector. The positioning of the connector with respect to the indentors is simplified when the crimp head is specific to that connector size.

However, many dieless crimp heads are configured for use with multiple sizes of connectors and, in these circumstances, the connector can be improperly crimped and/or the head or tool damaged if the connector is not properly positioned relative to the one or more indentors.

Accordingly, it has been determined by the present disclosure that there is a need for dieless crimp heads with positioning devices that overcome, alleviate, and/or mitigate one or more of the aforementioned and other deleterious effects of the prior art.

SUMMARY

A dieless crimp head is provided that includes a frame, an indentor, and a first positioning device. The frame has a first frame shell and a second frame shell, which define a frame opening. The indentor converges on a crimp center within the frame opening. The first positioning device has a connector slot defining a connector receipt area. The first positioning device is removably secured in the frame opening of the first frame shell at a use position in which the connector receipt area and the crimp center are aligned with, but offset along, a longitudinal axis of the crimp head.

In some embodiments either alone or together with any one or more of the aforementioned and/or after-mentioned embodiments, the dieless crimp head further includes a second positioning device having a second connector slot defining a second connector receipt area. The second positioning device is removably secured in the frame opening of the second frame shell with the second connector receipt area and the crimp center aligned with, but offset along, the longitudinal axis of the crimp head.

In some embodiments either alone or together with any one or more of the aforementioned and/or after-mentioned embodiments, the frame is a latched frame includes a movable latch connected to the frame by a set of pins.

In some embodiments either alone or together with any one or more of the aforementioned and/or after-mentioned embodiments, the frame is a C-type frame.

In some embodiments either alone or together with any one or more of the aforementioned and/or after-mentioned embodiments, the indentor is a plurality of indentors.

In some embodiments either alone or together with any one or more of the aforementioned and/or after-mentioned embodiments, the indentor is four indentors.

In some embodiments either alone or together with any one or more of the aforementioned and/or after-mentioned embodiments, the first frame shell and the first positioning device each have one or more engaging features configured to removably engage the first frame shell and the first positioning device with one another.

In some embodiments either alone or together with any one or more of the aforementioned and/or after-mentioned embodiments, the first frame shell has a first engaging feature and a third engaging feature and the first positioning device has a second engaging feature and a fourth engaging feature. The first and third engaging features are removably engaged with one another and the second and fourth engaging features are removably engaged with one another.

In some embodiments either alone or together with any one or more of the aforementioned and/or after-mentioned embodiments, the first engaging feature is a lip and the second engaging feature is a groove.

In some embodiments either alone or together with any one or more of the aforementioned and/or after-mentioned embodiments, the third engaging feature is a catch and the fourth engaging feature is a detent.

In some embodiments either alone or together with any one or more of the aforementioned and/or after-mentioned embodiments, the first positioning device is made of a polymeric material or a metallic material.

A method of assembling a dieless crimp head is also provided. The method includes selecting a positioning device having a connector slot and a connector receiving area; and removably securing the positioning device into a frame opening of a frame shell with the connector receiving area and a crimp center aligned, but offset along, a longitudinal axis.

In some embodiments either alone or together with any one or more of the aforementioned and/or after-mentioned embodiments, the step of removably securing the positioning device into the frame opening includes removably engaging features of the positioning device with features of the frame shell.

In some embodiments either alone or together with any one or more of the aforementioned and/or after-mentioned embodiments, the step of removably securing the positioning device into the frame opening includes: inserting the positioning device into the frame opening with a first engaging feature of the frame shell removably engaged with a second engaging feature of the positioning device and with the connector slot rotated, about a transverse axis, with respect to the longitudinal axis; sliding the positioning device along the longitudinal axis into the frame opening; and rotating the positioning device about the transverse axis so that a third engaging feature of the frame shell is removably engaged with a fourth engaging feature of the positioning device.

In some embodiments either alone or together with any one or more of the aforementioned and/or after-mentioned embodiments, the first engaging feature is a lip and the third engaging feature is a groove.

In some embodiments either alone or together with any one or more of the aforementioned and/or after-mentioned embodiments, the second engaging feature is a catch and the fourth engaging feature is a detent.

In some embodiments either alone or together with any one or more of the aforementioned and/or after-mentioned embodiments, the step of selecting the positioning device includes matching a size of the positioning device to a size of a connector to be crimped.

The above-described and other features and advantages of the present disclosure will be appreciated and understood by those skilled in the art from the following detailed description, drawings, and appended claims.

DESCRIPTION OF THE DRAWINGS

FIG. 1 illustrates a dieless crimp head according to the present disclosure;

FIG. 2 illustrates the head of FIG. 1 in an activated position with guide installed;

FIGS. 15-19 illustrates the position device during installation into the head.

DETAILED DESCRIPTION

Figure 3:
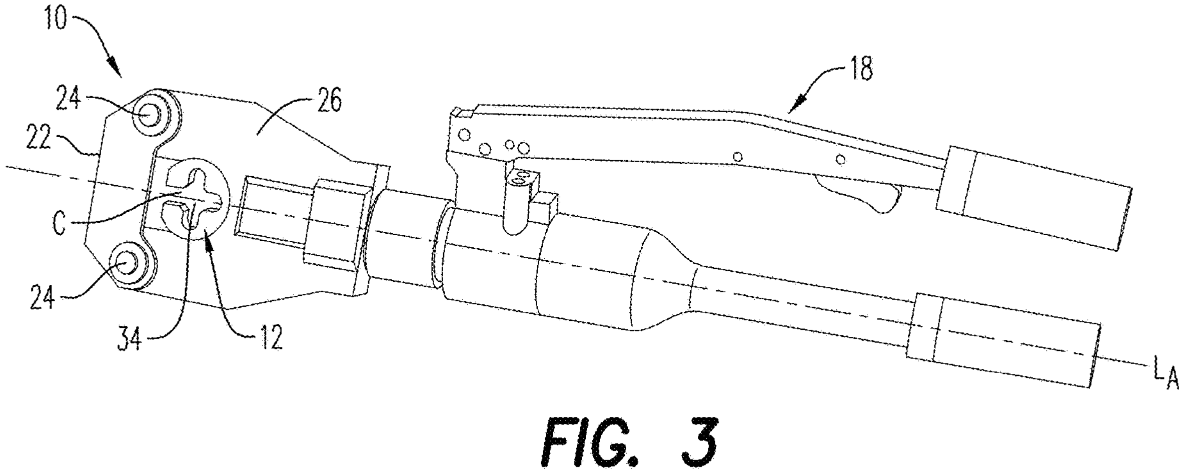
FIG. 3 illustrates the head of FIG. 1 in use with a manually operated crimping tool.

Referring to the drawings and in particular to FIGS. 1-2, an exemplary embodiment of a dieless crimp head according to the present disclosure is shown and is generally referred to by reference numeral 10. Advantageously, head 10 includes a positioning device 12 that is configured to properly position a connector to be crimped (not shown) with respect to indentors 14 of the crimp head.

Figure 4:
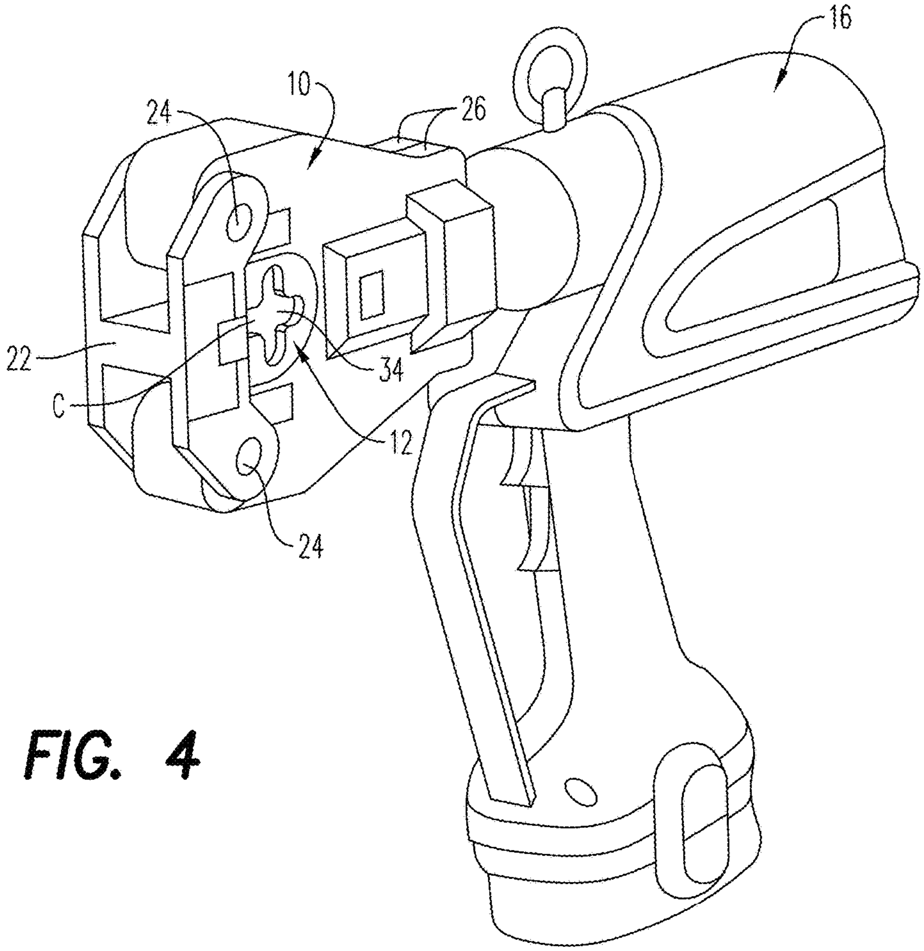
FIG. 4 illustrates the head of FIG. 1 in use with a battery-operated hydraulic crimping tool.

Head 10 can find use with a commercially available manually-operated tool 16 as shown in FIG. 3. Additionally, head 10 can find use with a commercially available battery-operated hydraulic crimping tool 18 as shown in FIG. 4.

Returning to FIGS. 1-2, FIG. 1 illustrates head 10 prior to movement of indentors 14 to a crimping position, while FIG. 2 illustrates the head after movement of the indentors to the crimping position. Here, a crimp center C is shown, which is the location that indentors 14 converge during activation of head 10. Positioning device 12 is configured to align a connector installed in the positioning device with the crimp center C during the crimping process.

Advantageously, head 10 and positioning device 12 can be configured to allow the positioning device to be easily removed and/or replaced with positioning devices useable with connectors of alternate sizes. In this manner, head 10 is configured for use with multiple sizes of connectors and can ensure that the connector is properly crimped and/or without damage to the head/tool that can be caused when the connector is not properly positioned relative to indentors 14.

Head 10 is illustrated by way of example as a four-point crimp head with a latch style type of frame 20. Specifically, frame 20 has a movable latch 22 connected to the frame 20 by a set of pins 24 in a known manner. The four-point crimp head has four indentors 14 for indenting or crimping an electrical connector (not shown) on to a conductor (also not shown) from four sides also in a known manner.

Of course, it is contemplated by the present disclosure for head 10 to have more or less than four indentors 14—with at least one indentor being the minimum desired number of indentors and eight indentors being the maximum number of desired indentors.

Figure 5:
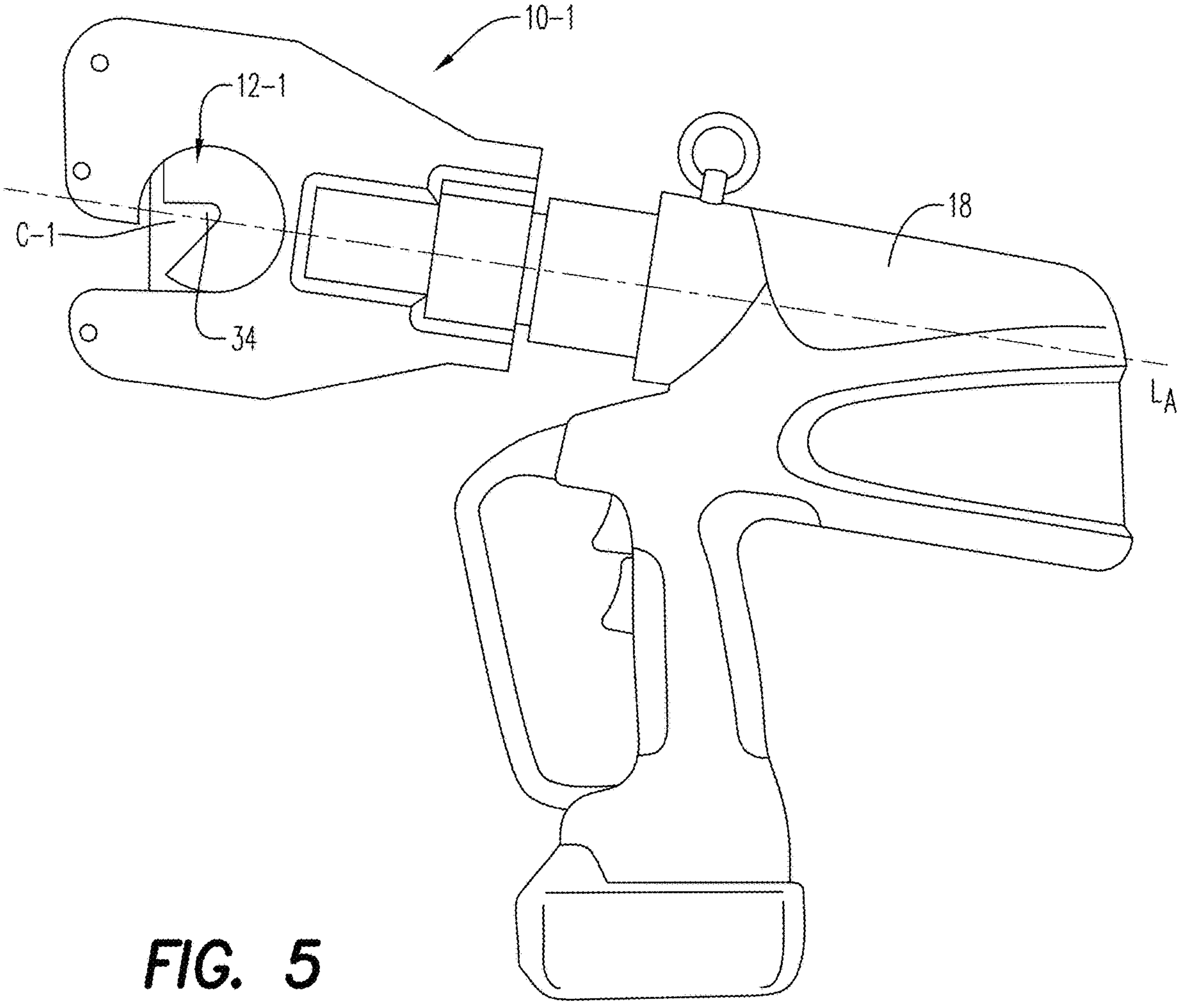
FIG. 5 illustrates a C-type dieless crimp head in use with a battery-operated hydraulic crimping tool.
Figure 6:
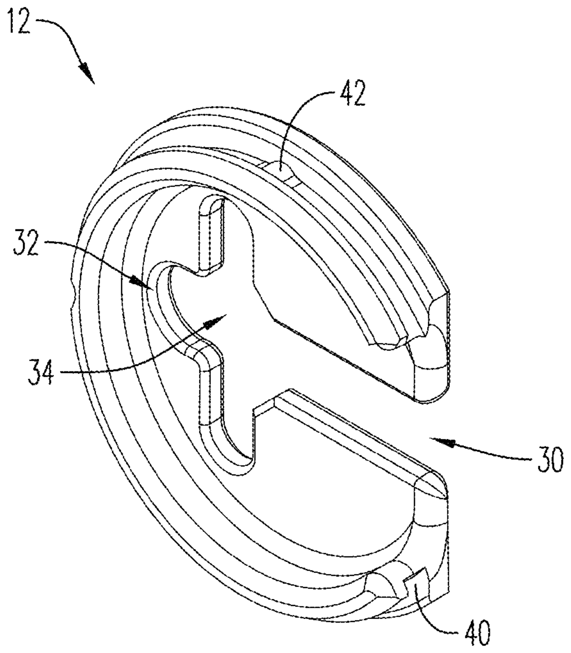
FIGS. 6-9 are views of an exemplary embodiment of the positioning device of FIG. 1.
Figure 7:
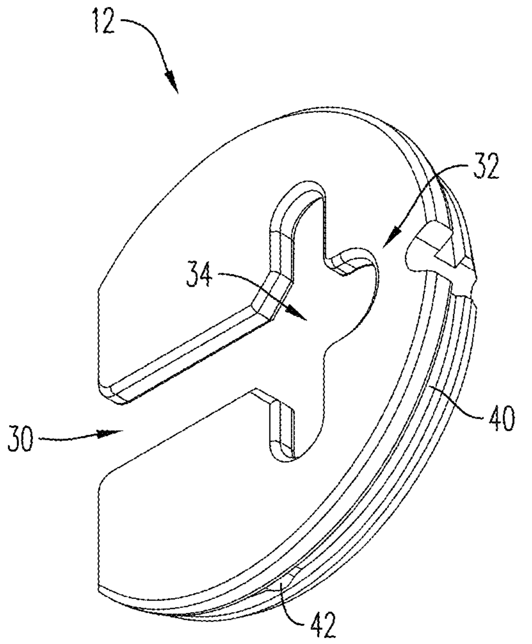
Figure 8:
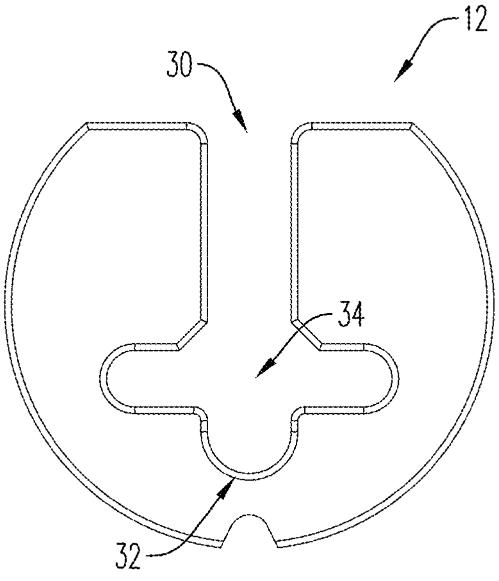
Figure 9:
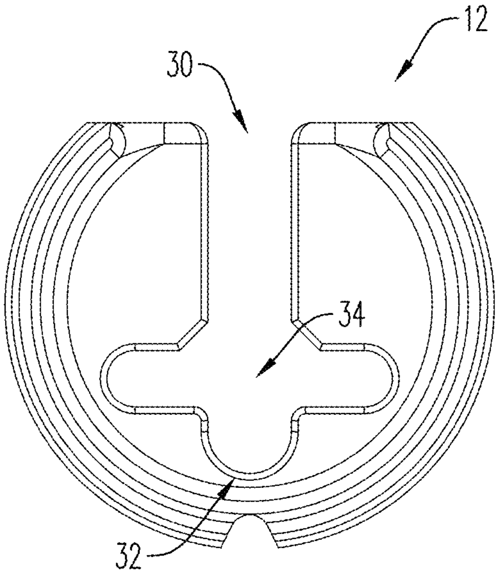
Figure 10:
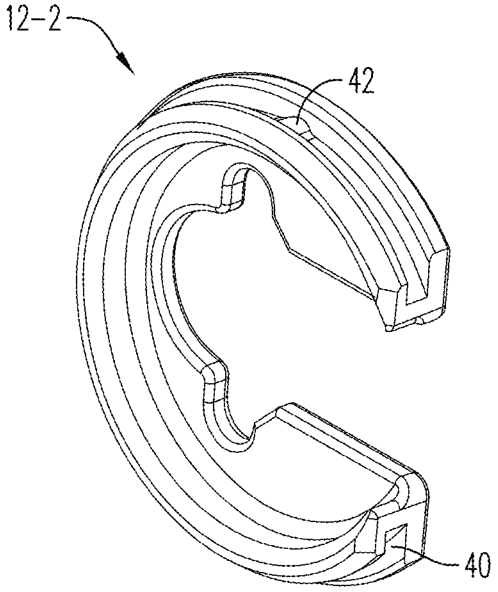
FIGS. 10-13 are views of an alternate embodiment of the positioning device of FIGS. 6-9.
Figure 11:
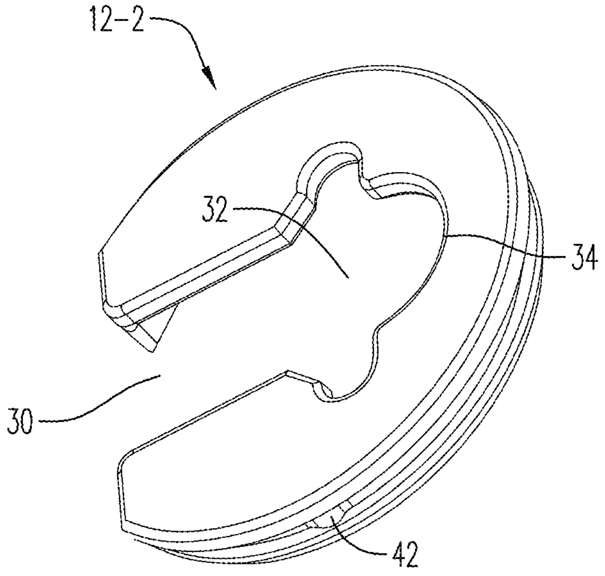
Figure 12:
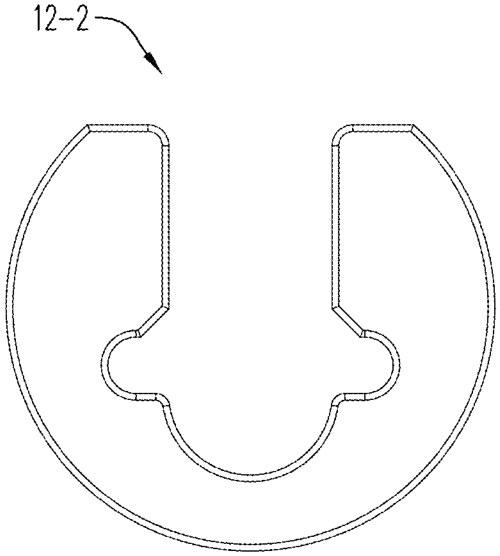
Figure 13:
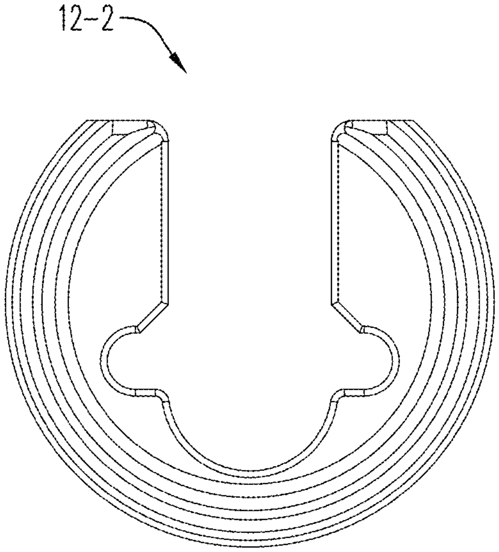

Furthermore, it is also contemplated by the present disclosure for the dieless crimp head to be a C-type dieless crimp head 10-1 as in FIG. 5 with positioning device 12-1 being secured to the C-type dieless crimp head to properly position the connector with respect to a crimp center C-1 of the indentors (not shown).

Returning to FIGS. 1-2, frame 20 includes a pair of frame shells 26, one on each side. At least one of shells 26 is configured to removably secure a single positioning device 12 on one side of head 10. However, in other embodiments, both shells 26 are configured to removably secure positioning devices 12 in opposite sides of head 10.

Prior to installation of positioning device 12, frame 20 has an opening 28 that accommodates a range of connector sizes, such as from 8 American wire gauge (AWG) to 1000 thousandths circular mils (kcmil) connectors. It has been determined by the present disclosure that the size of opening 28 with respect to crimp center C provides opportunity for user to misload connector into head 10, causing potentially detrimental damage to the tool, crimp head and/or, connection.

Positioning device 12 provides the necessary clearance for connections but with a smaller, less variable range of diameters than opening 28 encompasses, which blocks the user from incorrectly installing the connector/conductor to be crimped into the tool head with respect to the crimp center C, ultimately eliminating the opportunity for the operator to damage the head/connection. Additionally, the mounting interface of the guides provides a simple, obvious installation and removal method for quick, efficient installation and removal.

An exemplary embodiment of positioning device 12 is illustrated in FIGS. 6-9.

Positioning device 12 may be fabricated from any material of strength sufficient to secure connector and conductor in head 10 during use. For example, positioning device 12 can be made of materials such as, but not limited to, polymeric materials or metallic materials. In some examples, positioning device 12 can be made of injection molded polymeric materials such as, but not limited to, polycarbonate, acrylonitrile butadiene styrene (ABS) plastic, glass filled nylon, or other polymeric materials with similar material properties.

In further embodiments, positioning device 12 can be transparent or translucent polymers to allow visual inspection of the connector/conductor in head 10.

In still other embodiments, positioning device 12 can be made of cast, machines, or injection molded metallic materials such as, but not limited to, aluminum, titanium, stainless steel, or spring steel.

Positioning device 12 has a connector slot 30. Slot 30 extends through a thickness of positioning device 12 and has a closed end 32 at a connector receiving area 34. When positioning device 12 is installed in head 10, area 34 is aligned with but offset from crimp center C along a longitudinal axis $L_A$ as shown in FIG. 1. Slot 30 is sized and positioned to reduce the range of connector sizes of opening 28 to a smaller, number of sizes to ensure that the connector remains properly positioned with respect to crimp center C of indentors 14.

During use, an uncrimped connector (not shown) is placed into area 34 with a conductor in the uncrimped connector. Upon activation of head 10, the connector is moved in slot 30 along longitudinal axis $L_A$ by indentors 14—as the indentors are moved to crimp center C. At crimp center C, indentors 14 crimp the connector onto the conductor. Upon deactivation of head 10, indentors 14 return to the normal position and the crimped connector/conductor can be removed from positioning device 12 at area 34 in a direction along a transverse axis $T_A$.

Positioning device 12 of FIGS. 6-9 is configured to reduce opening 28 of head 10 to between #8 AWG to #6 Aluminum and #4 Copper.

Further, positioning device 12-2 of FIGS. 10-13 is configured to reduce opening 28 of head 10 to between #5 Aluminum and #3 Copper AWG to 3/0 Aluminum and 250 kcmil Copper. In this manner, the use of one or more positioning devices 12, 12-2 with head 10 can adapted the head for more accurate and reproducible use with connectors then previously possible.

Figure 14:
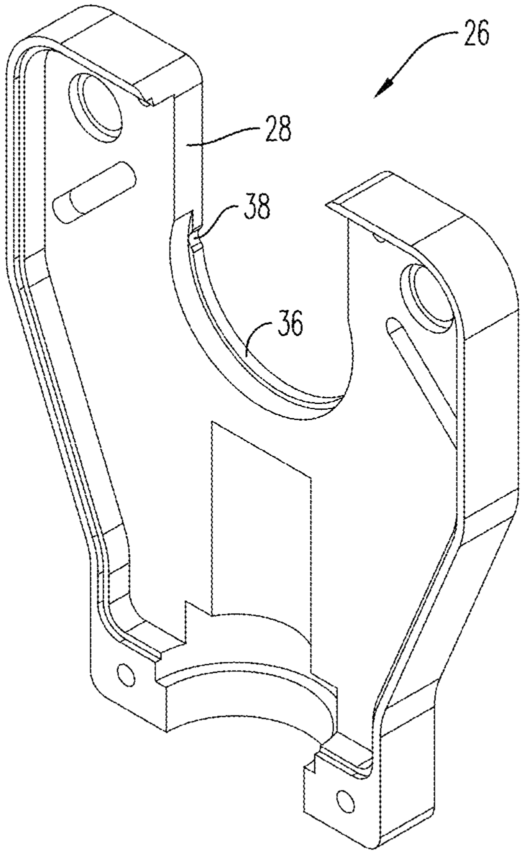
FIG. 14 illustrates a frame shell of the head of FIG. 1.
Figure 15:
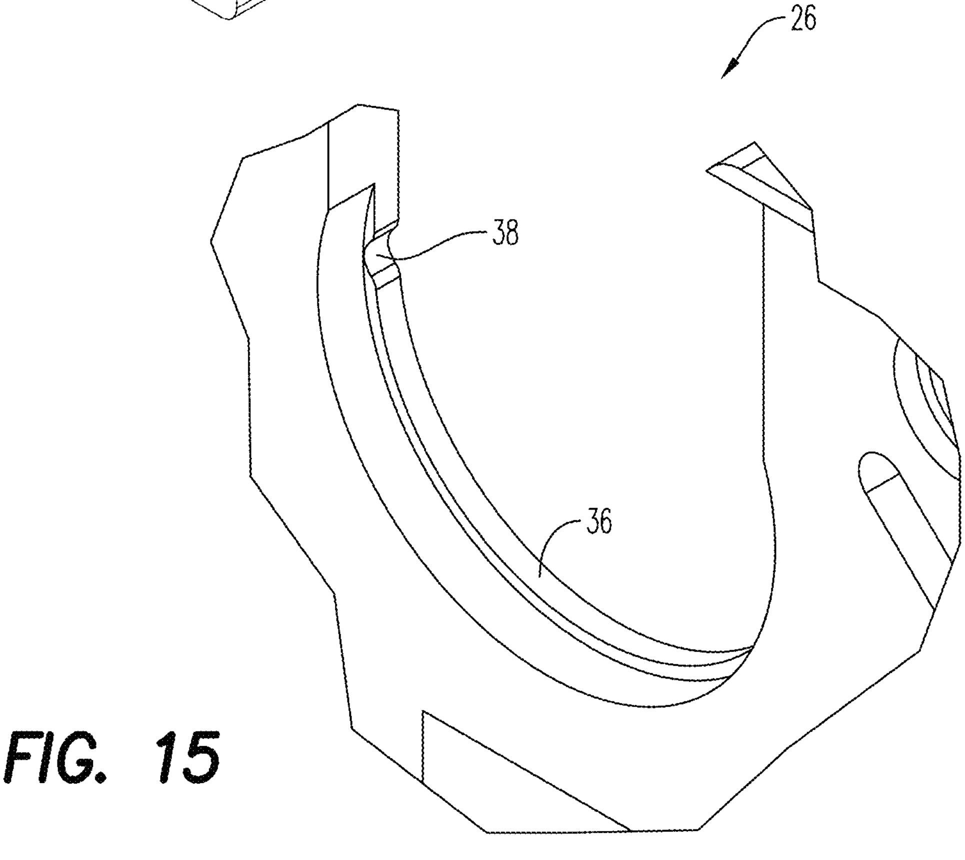
FIG. 15 is an enlarged view of the frame shell of FIG. 14.

The removable connection of head 10 and positioning device 12 is described with reference to the positioning device of FIGS. 6-9 and the frame shell 26 of FIGS. 14-15.

Frame shell 26 includes a lip 36 and a catch 38, while positioning device 12 includes a radial retention groove 40 having a detent 42 positioned in the recess. Once installed, lip 36 resides in groove 40 and detent 42 resides in catch 38. In this manner, positioning device 12 is secured and oriented to shell 26 in opening 28.

The interconnection of lip 36 and groove 40 prevents positioning device 12 from moving along transverse axis $T_A$ shown in FIG. 1, yet allows the positioning device to slide along a longitudinal axis $L_A$ and allows rotation of the positioning device about the transverse axis $T_A$. The interaction of catch 38/detent 42 and lip 36/groove provide a removable engagement of positioning device 12 and shell 26 when the positioning device is at a desired location—along transverse axis $T_A$, along longitudinal axis $L_A$, and about the transverse axis $T_A$.

It should be recognized by that the present disclosure is illustrated by way of example as having lip 36 on frame shell 26 and groove 40 on positioning device 12. However, it is equally contemplated by the present disclosure for frame shell 26 to have groove 40 and for positioning device 12 to have lip 36. Thus, lip 36 and groove 40 are first and second engaging features that can be configured on the components as desired.

Similarly, it should also be recognized that the present disclosure is illustrated by way of example as having catch 38 on frame shell 26 and detent 42 on positioning device 12. However, it is equally contemplated by the present disclosure for frame shell 26 to have detent 42 and for positioning device 12 to have catch 38. Thus, catch 38 and detent 42 are third and fourth engaging features that can also be configured on the components as desired.

The installation/removal of positioning device 12 to/from head 10 and the interconnection of these components can be understood further with reference to FIGS. 16-19.

Figure 16:
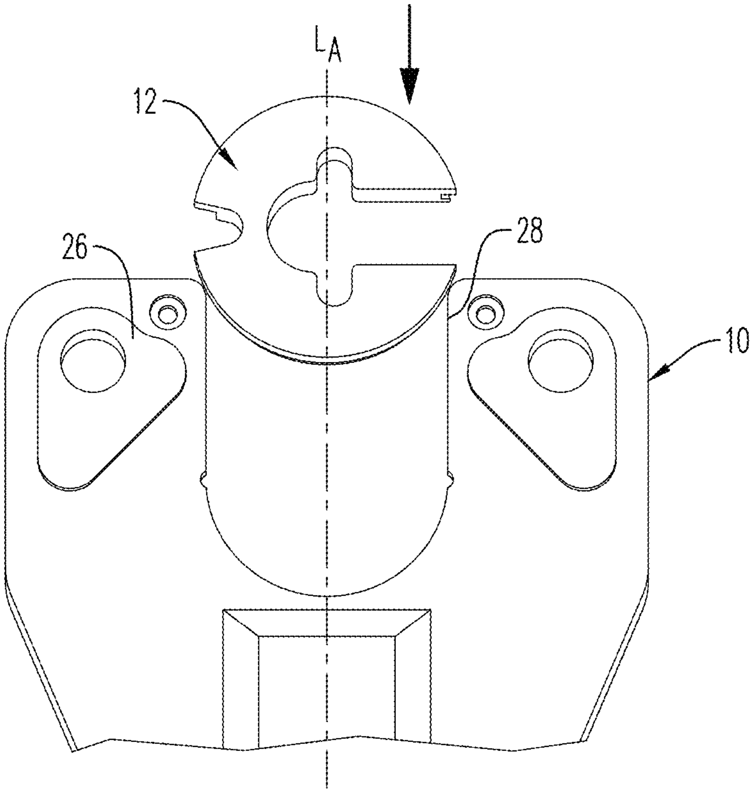
Figure 17:
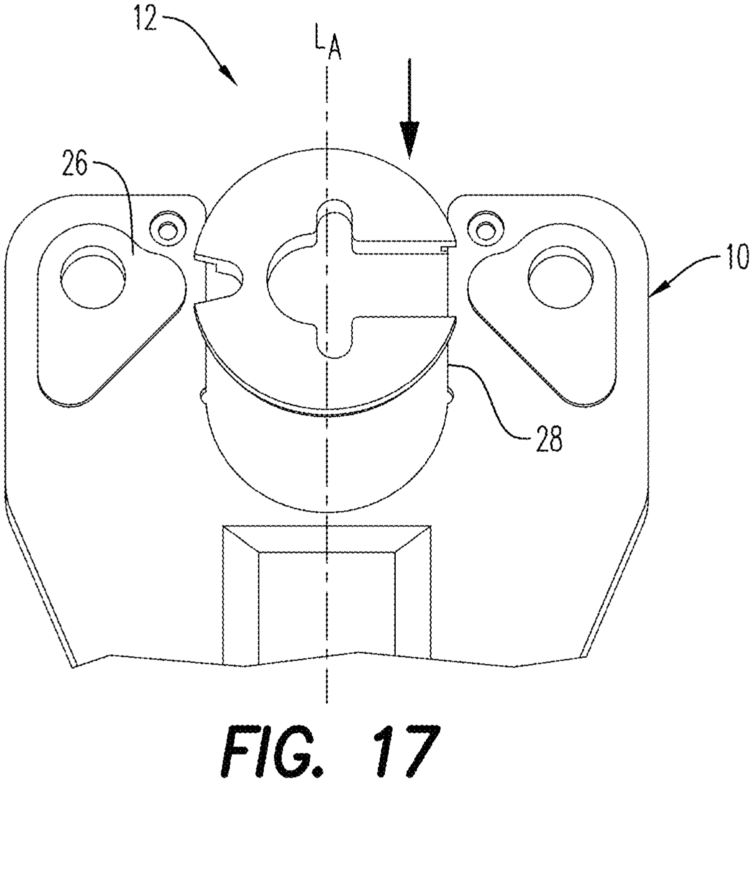

FIG. 16 illustrates a front or outer side of shell 26 at the beginning of connection of positioning device 12 to head 10. Here, positioning device 12 is placed in opening 28 of shell 26 along longitudinal axis $L_A$—with the positioning device rotated about transverse axis $T_A$ by about 90 degrees from a use position—with lip 36 engaged in groove 40.

FIG. 17 again illustrates the front or outer side of shell 26, but with positioning device 12 having been slid into head 10 along longitudinal axis $L_A$ with lip 36 remaining engaged in groove 40.

Figure 18:
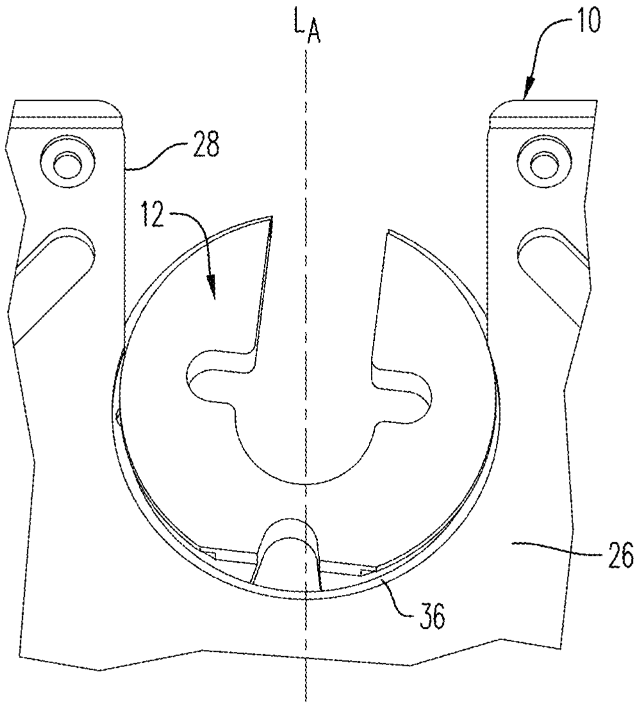
Figure 19:
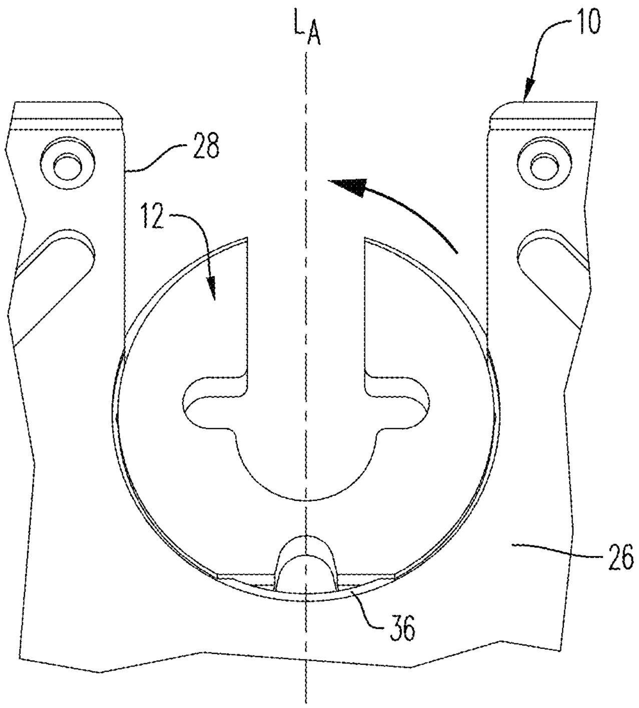

FIG. 18 illustrates a back or inner side of shell 26, but with positioning device 12 having been slid further into head 10 along longitudinal axis $L_A$ with lip 36 remaining engaged in groove 40 and with positioning device 12 rotated about transverse axis $T_A$ by 10 degrees from a use position—namely prior to engagement of catch 38 and detent 42. As used herein, the “use position” is defined as the position of device 12 when installed in head 10 with area 34 of the positioning device aligned with but offset from the crimp center C of the head along longitudinal axis $L_A$.

FIG. 19 again illustrates the back or inner side of shell 26, but with positioning device 12 having been slid all the way into head 10 along longitudinal axis $L_A$ with lip 36 remaining engaged in groove 40 and with positioning device 12 rotated about transverse axis $T_A$ to a use position with catch 38 and detent 42 engaged with one another.

Simply stated, when positioning device 12 is rotated about transverse axis $T_A$ away from the use position, the positioning device is free to slide with respect to shell 26 with lip 36 remaining engaged in groove 40, but without detent 42 and catch 38 being engaged. Once positioning device 12 is at the bottom of opening 28, the positioning device can be rotated about transverse axis $T_A$ so that detent 42 and catch 38 engage.

Removal of positioning device 12 from head 10 is easily accomplished by reversing the above noted process, namely rotating the positioning device from the use position about transverse axis $T_A$ to disengage catch 38 and detent 42, then sliding the positioning device upward along longitudinal axis $L_A$ and out of opening 28.

Accordingly, head 10 and positioning device 12 are configured—by interaction of lip 36 and groove 40—as well as the interaction of catch 38 and detent 42—to properly locate and secure the positioning device in the use position within head 10. Further, positioning device 12—by the shape and location of slot 30, closed end 32, and area 34 reduces the size of opening 28 of head 10.

It should be recognized that head 10 is described herein by way of example having positioning device 12 installed into opening 28 first by movement in along longitudinal axis $L_A$, then rotation about transverse axis $T_A$. Of course, it is also contemplated by the present disclosure of the engaging features of head 10 and positioning device 12 to be configured so that the positioning device is secured in opening 28 by movement along transverse axis $T_A$, followed by rotation about the transverse axis $T_A$.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A dieless crimp head, comprising:

a frame having a first frame shell and a second frame shell, the first and second frame shells defining a frame opening of a fixed dimension;

an indentor configured to converge on a crimp center within the frame opening;

a first positioning device having a connector slot, a connector receipt area, and a closed end, the connector slot being narrower than the connector receipt area; and a second positioning device having a second connector slot defining a second connector receipt area, the first positioning device being removably secured in the frame opening of the first frame shell at a use position in which the connector receipt area is aligned with, but offset along, a longitudinal axis of the crimp head from the crimp center, and the second positioning device being identically shaped to the first positioning device and being removably secured in the frame opening of the second frame shell with the second connector receipt area and the crimp center aligned with, but offset along, the longitudinal axis of the crimp head.

2. The dieless crimp head of claim 1, wherein the frame is a latched frame comprising a movable latch connected to the frame by a set of pins.

3. The dieless crimp head of claim 1, wherein the frame is a C-type frame.

4. The dieless crimp head of claim 1, wherein the indentor comprises a plurality of indentors.

5. The dieless crimp head of claim 4, wherein the plurality of indentors comprise four indentors.

6. The dieless crimp head of claim 1, wherein the first frame shell and the first positioning device each comprise one or more engaging features configured to removably engage the first frame shell and the first positioning device with one another.

7. The dieless crimp head of claim 1, wherein the first frame shell comprises a first engaging feature and a third engaging feature, wherein the first positioning device comprises a second engaging feature and a fourth engaging feature, the first and third engaging features are removably engaged with one another and the second and fourth engaging features are removably engaged with one another.

8. The dieless crimp head of claim 7, wherein the first engaging feature is a lip and the second engaging feature is a groove.

9. The dieless crimp head of claim 8, wherein the third engaging feature is a catch and the fourth engaging feature is a detent.

10. The dieless crimp head of claim 7, wherein the third engaging feature is a catch and the fourth engaging feature is a detent.

11. The dieless crimp head of claim 1, wherein the first positioning device is made of a polymeric material or a metallic material.

12. A dieless crimp head, comprising:

a frame having a first frame shell and a second frame shell, the first and second frame shells defining a frame opening;

an indentor configured to converge on a crimp center within the frame opening; and a first positioning device having a connector slot, a connector receipt area, and a closed end, the connector slot being narrower than that connector receipt area, the first positioning device being removably secured in the frame opening of the first frame shell at a use position in which the connector receipt area is aligned with, but offset along, a longitudinal axis of the crimp head from the crimp center, wherein the first frame shell comprises a first engaging feature and a third engaging feature, wherein the first positioning device comprises a second engaging feature and a fourth engaging feature, the first and third engaging features are removably engaged with one another and the second and fourth engaging features are removably engaged with one another, and wherein the first engaging feature is a lip and the second engaging feature is a groove.

13. The dieless crimp head of claim 12, wherein the frame is a latched frame comprising a movable latch connected to the frame by a set of pins.

14. The dieless crimp head of claim 12, wherein the frame is a C-type frame.

15. A dieless crimp head, comprising:

a frame having a first frame shell and a second frame shell, the first and second frame shells defining a frame opening;

an indentor configured to converge on a crimp center within the frame opening; and a first positioning device having a connector slot, a connector receipt area, and a closed end, the connector slot being narrower than that connector receipt area, the first positioning device being removably secured in the frame opening of the first frame shell at a use position in which the connector receipt area is aligned with, but offset along, a longitudinal axis of the crimp head from the crimp center, wherein the first frame shell comprises a first engaging feature and a third engaging feature, wherein the first positioning device comprises a second engaging feature and a fourth engaging feature, the first and third engaging features are removably engaged with one another and the second and fourth engaging features are removably engaged with one another, and wherein the third engaging feature is a catch and the fourth engaging feature is a detent.

16. The dieless crimp head of claim 15, wherein the frame is a latched frame comprising a movable latch connected to the frame by a set of pins.

17. The dieless crimp head of claim 15, wherein the frame is a C-type frame.

* * * * *